United States Patent
Noda

(10) Patent No.: US 10,034,465 B2
(45) Date of Patent: *Jul. 31, 2018

(54) FISHING ROD

(71) Applicant: GLOBERIDE, Inc., Tokyo (JP)

(72) Inventor: Takahito Noda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 14/556,438

(22) Filed: Dec. 1, 2014

(65) Prior Publication Data

US 2015/0150227 A1    Jun. 4, 2015

(30) Foreign Application Priority Data

Nov. 29, 2013    (JP) .................................. 2013-247568

(51) Int. Cl.
| | |
|---|---|
| *A01K 87/00* | (2006.01) |
| *A01K 87/02* | (2006.01) |
| *A01K 87/04* | (2006.01) |

(52) U.S. Cl.
CPC .............. *A01K 87/04* (2013.01); *A01K 87/00* (2013.01); *A01K 87/02* (2013.01)

(58) Field of Classification Search
CPC ................................. A01K 87/00; A01K 87/02
USPC ............................... 43/18.1 R, 18.5, 18.1 CT
See application file for complete search history.

(56) References Cited

U.S. PATENT DOCUMENTS

| | | | | |
|---|---|---|---|---|
| 2,749,643 | A | * 6/1956 | Scott ...................... | A01K 87/00 43/18.5 |
| 3,461,593 | A | 8/1969 | Martuch | |
| 3,953,637 | A | 4/1976 | Phillips | |
| 4,015,360 | A | * 4/1977 | Herter .................... | A01K 87/00 43/18.5 |
| 4,070,127 | A | * 1/1978 | Loomis .................. | A01K 87/02 43/18.5 |
| 4,083,140 | A | * 4/1978 | Van Auken ............ | A01K 87/00 43/18.5 |
| 4,157,181 | A | 6/1979 | Cecka | |
| 4,178,713 | A | * 12/1979 | Higuchi ................. | A01K 87/00 43/18.5 |
| 4,468,270 | A | * 8/1984 | Green ................... | B29C 53/562 43/18.5 |

(Continued)

FOREIGN PATENT DOCUMENTS

| | | | | |
|---|---|---|---|---|
| EP | 0826481 A2 | 3/1998 | | |
| EP | 2888937 A1 | * 7/2015 | ............. | A01K 87/00 |

(Continued)

OTHER PUBLICATIONS

Translation of JP2003-102344.*

(Continued)

*Primary Examiner* — Darren W Ark
(74) *Attorney, Agent, or Firm* — Pillsbury Winthrop Shaw Pittman, LLP

(57) ABSTRACT

Provided is a fishing rod having a flexible and durable tip. A fishing rod according to the discloser includes a tip rod made of a fiber-reinforced resin material The tip rod 12 is formed of short fibers dispersed in a matrix resin material, the average fiber diameter of the short fibers is 3 to 15 µm, the average fiber length of the short fibers is 0.5 to 10 mm, and the content of the short fibers is 3 to 50 wt %.

8 Claims, 7 Drawing Sheets

(56) References Cited

U.S. PATENT DOCUMENTS

| | | | | |
|---|---|---|---|---|
| 4,653,216 A * | 3/1987 | Inoue | A01K 87/00 | |
| | | | 43/18.5 | |
| 4,685,241 A * | 8/1987 | Foote | A01K 87/00 | |
| | | | 43/18.5 | |
| 4,759,147 A * | 7/1988 | Pirazzini | A01K 87/00 | |
| | | | 43/18.5 | |
| 4,860,481 A * | 8/1989 | Christenson | A01K 87/00 | |
| | | | 43/18.5 | |
| 4,876,143 A | 10/1989 | Sugita | | |
| 4,885,865 A | 12/1989 | Rumbaugh | | |
| 5,076,004 A | 12/1991 | Sunaga et al. | | |
| 5,239,768 A * | 8/1993 | Michishita | A01K 87/08 | |
| | | | 43/18.1 R | |
| 5,328,742 A | 7/1994 | Tukihara | | |
| 5,338,604 A | 8/1994 | Yasui | | |
| 5,529,731 A | 6/1996 | Bendick | | |
| 5,686,155 A | 11/1997 | Suzue | | |
| 5,721,030 A | 2/1998 | Okada | | |
| 5,964,056 A * | 10/1999 | Grice | A01K 87/00 | |
| | | | 43/18.5 | |
| 6,088,947 A * | 7/2000 | Suzue | A01K 87/00 | |
| | | | 43/18.1 R | |
| 6,106,413 A | 8/2000 | Kusumoto | | |
| 6,148,558 A * | 11/2000 | Ono | A01K 87/00 | |
| | | | 43/18.1 R | |
| 6,286,244 B1* | 9/2001 | Weiss | A01K 87/04 | |
| | | | 43/18.1 R | |
| 6,301,821 B1* | 10/2001 | Suzue | A01K 87/00 | |
| | | | 43/18.1 R | |
| 6,524,195 B1* | 2/2003 | Kusumoto | A63B 53/10 | |
| | | | 43/18.5 | |
| 6,601,334 B1* | 8/2003 | Ono | A01K 87/00 | |
| | | | 43/18.1 R | |
| 6,709,347 B1* | 3/2004 | Ono | A01K 87/00 | |
| | | | 43/18.5 | |
| 7,305,792 B2* | 12/2007 | Kato | A01K 87/00 | |
| | | | 43/18.1 R | |
| 7,584,571 B2* | 9/2009 | Ryan | A01K 87/02 | |
| | | | 43/18.1 CT | |
| 7,888,275 B2 | 2/2011 | Ward et al. | | |
| 8,001,716 B1* | 8/2011 | Lepage | A01K 87/00 | |
| | | | 43/18.5 | |
| 2004/0200123 A1 | 10/2004 | Whiting | | |
| 2005/0178040 A1 | 8/2005 | Kato | | |
| 2005/0223617 A1* | 10/2005 | Morita | A01K 87/00 | |
| | | | 43/18.5 | |
| 2006/0185218 A1* | 8/2006 | Whiting | A01K 87/00 | |
| | | | 43/18.5 | |
| 2007/0039229 A1* | 2/2007 | Wang | A01K 87/00 | |
| | | | 43/18.1 R | |
| 2010/0189963 A1 | 7/2010 | Nair | | |
| 2015/0150227 A1 | 6/2015 | Noda | | |
| 2015/0181849 A1* | 7/2015 | Noda | A01K 87/00 | |
| | | | 43/24 | |
| 2015/0181850 A1* | 7/2015 | Noda | A01K 87/00 | |
| | | | 43/18.5 | |
| 2016/0183505 A1* | 6/2016 | Noda | B29C 70/202 | |
| | | | 43/18.1 CT | |

FOREIGN PATENT DOCUMENTS

| | | | | |
|---|---|---|---|---|
| EP | 2888937 B1 * | 3/2017 | | A01K 87/00 |
| FR | 2892892 A1 * | 5/2007 | | A01K 87/007 |
| GB | 1 393 102 | 5/1975 | | |
| GB | 1393102 A * | 5/1975 | | A01K 87/00 |
| GB | 2064420 | 6/1981 | | |
| GB | 2064420 A * | 6/1981 | | A01K 87/00 |
| GB | 2249006 B * | 6/1994 | | A01K 87/08 |
| GB | 2511905 A * | 9/2014 | | B41M 3/06 |
| JP | S5480372 A | 6/1979 | | |
| JP | 58-211442 | 12/1983 | | |
| JP | 58-211442 A * | 12/1983 | | |
| JP | 60-212334 | 10/1985 | | |
| JP | 60212334 A * | 10/1985 | | |
| JP | 60212335 A * | 10/1985 | | |
| JP | 06-197669 | 7/1994 | | |
| JP | 09-056301 | 3/1997 | | |
| JP | 09056301 A * | 3/1997 | | |
| JP | 09248103 A * | 9/1997 | | |
| JP | H09248103 A | 9/1997 | | |
| JP | 2000-93559 A | 4/2000 | | |
| JP | 2000093559 A * | 4/2000 | | |
| JP | 2001037378 A * | 2/2001 | | |
| JP | 2001-190185 A | 7/2001 | | |
| JP | 2001-275520 A | 10/2001 | | |
| JP | 2002233274 A * | 8/2002 | | |
| JP | 2003102344 A * | 4/2003 | | |
| JP | 3511559 B2 | 3/2004 | | |
| JP | 3582778 B2 * | 10/2004 | | |
| JP | 3582778 B2 | 10/2004 | | |
| JP | 2006034292 A * | 2/2006 | | |
| JP | 2006-101779 A | 4/2006 | | |
| JP | 2006101779 A * | 4/2006 | | |
| JP | 3884253 B2 | 2/2007 | | |
| JP | 2007-209301 A | 8/2007 | | |
| JP | 2007209301 A * | 8/2007 | | |
| JP | 2009060916 A * | 3/2009 | | |
| JP | 2009-207357 | 9/2009 | | |
| JP | 5155083 B2 | 2/2013 | | |
| JP | 5155083 B2 * | 2/2013 | | |
| KR | 100359183 | 10/2002 | | |
| KR | 201 001 26611 A * | 12/2010 | | |

OTHER PUBLICATIONS

Translation of JP09-248103.*
Translation of JP5155083.*
Translation of JP200093559.*
English translation JP 2003-102344.*
Chinese Office Action dated Sep. 1, 2016 for Appln. No. 201410830233.4.*
Chinese Office Action dated Jul. 18, 2016 for Application No. 201410686908.2.
Japanese Office Action dated Oct. 13, 2016 for Application No. 2013-247568.
Extended European Search Report dated Apr. 9, 2015 for Appln. No. 14195379.4.
Office Action Korean Patent Application No. 10-2014-0164944 dated Jun. 8, 2017 with English language translation.
European Office Action dated Jan. 18, 2017 for Appln. No. 14195379.4.
Office Action Korean Patent Application No. 10-2014-0185844 dated Dec. 21, 2017 w/English translation.
Office Action Korean Patent Application No. 10-2014-0185852 dated Dec. 26, 2017 w/English translation.
Office Action Korean Patent Application No. 10-2014-0164944 dated Dec. 21, 2017 w/English translation.
Office Action Chinese Patent Application No. 201510954067.3 dated Dec. 12, 2017 with English translation.
Non-final Office Action Korean Patent Application No. 10-2014-0185852 dated Jun. 12, 2017 with English language translation.
Third Office Action Chinese Patent Application No. 201410828614.9 dated Jun. 28, 2017 with English translation.
Fourth Office Action Chinese Patent Application No. 201410686908.2 dated Feb. 2, 2018 with English translation.
Second Office Action Chinese Patent Application No. 201410686908.2 dated Jan. 12, 2017 with English translation.
Third Office Action Chinese Patent Application No. 201410686908.2 dated Jul. 7, 2017 with English translation.
Extended European Search Report EP Application No. 14200451.4 dated Apr. 9, 2015.
Extended European Search Report EP Application No. 15201502.0 dated May 9, 2016.
Second Office Action Chinese Patent Application No. 201410830233.4 dated Apr. 25, 2017 w/English translation.
Third Office Action Chinese Patent Application No. 201410830233.4 dated Sep. 6, 2017 w/English translation.

(56) References Cited

OTHER PUBLICATIONS

First Office Action Chinese Patent Application No. 201410828614.9 dated Jul. 18, 2016 w/English translation.
Office Action Korean Patent Application No. 10-2014-0185844 2017 dated Jun. 15, 2017 w/English translation.
Office Action Korean Patent Application No. 10-2015-0186205 dated Nov. 15, 2017 w/English translation.
Office Action Japanese Patent Application No. 2013-272429 dated Sep. 29, 2016 w/English translation.
Chinese Office Action in connection with Chinese Patent Application No. 201410828614.9 dated Feb. 13, 2017 with English translation thereof.
Japanese Office Action dated Sep. 29, 2016 for Appln. No. 2013-272426.
Extended European Search Report dated Apr. 10, 2015 for Appln. No. 14200034.8.
Communication pursuant to Article 94(3) EPC issued in corresponding EP Patent Application No. 15201502.0 dated Apr. 19, 2018.

* cited by examiner

FISHING ROD

CROSS-REFERENCE TO RELATED APPLICATIONS

This application is based on and claims the benefit of priority from Japanese Patent Application Serial No. 2013-247568 (filed on Nov. 29, 2013), the contents of which are hereby incorporated by reference in their entirety

TECHNICAL FIELD

The present disclosure relates to a fishing rod, more specifically, to a fishing rod having a special feature at a tip of the rod.

BACKGROUND

A common fishing rod has a prepreg wound around the body of the rod. The prepreg is a reinforced fiber extended in a specific direction and impregnated with a synthetic resin. The fishing rod has a tubular structure in order to reduce the weight of the rod. However, a tip of the rod may be made solid to obtain flexibility and to prevent damage thereon when the tip portion of the rod is largely bent by fish bites.

Japanese Patent Application Publication Nos. S54-80372 and H9-248103 disclose a solid tip made of a so-called fiber-reinforced resin material formed from a reinforced fiber (a carbon fiber, a glass fiber or the like) impregnated with a synthetic resin. The fiber-reinforced resin material is typically formed by pultrusion and disposed continuously from a proximal end to a distal end of the tip rod.

The above-described prior-art tip is formed from a material in which reinforced fibers are arranged continuously from the proximal end to the distal end (a continuous fiber solid body), therefore elongation of the material is dictated by the material of the selected reinforced fiber. For example, the elongation of the above mentioned carbon fiber and glass fiber is about 1.5% to 2.7% of the original total length, this means that the fiber itself does not stretch so much. Because of a low elongation of such reinforced fibers, a rigidity of the tip is relatively high and has a limited flexibility when the tip is bent. It is preferable that a tip of a rod be flexible enough to sense and see subtle fish bites and have a high strength (especially bending strength). Some solid tip rods made of the above-described fiber-reinforced resin material require more flexibility depending on target fish types and types of fishing. More flexible tip rod made of the continuous fiber can be obtained by reducing the outer diameter of the tip rod. However, if the tip rod is made too thin, processing and assembling of the rod become difficult.

SUMMARY

The present disclosure is intended to overcome the above problem. One object of the present invention is to provide a fishing rod having a flexible and durable tip.

A fishing rod according to the disclosure includes a tip made of a fiber-reinforced resin material formed of short fibers dispersed in a matrix resin. The average fiber diameter of the short fibers is 3 to 15 μm, the average fiber length of the short fibers is 0.5 to 10 mm, and the content of the short fibers is 3 to 50 wt %.

Because the tip of the rod is made of the fiber-reinforced resin material formed by dispersing the short fiber (the average fiber diameter is 3 to 15 μm, the average fiber length is 0.5 to 10 mm) in the matrix resin, the tip is soft and more flexible compared to the continuous fiber solid body in which a reinforced fiber is continuously arranged from the proximal end to the distal end. Consequently, with the above-mentioned rod, it is possible to more easily sense and see subtle fish bites. Moreover, because the short fiber is dispersed in the matrix resin, an amount of displacement allowed before breakage (fracture) is increased and such advantageous effect can be obtained even when the outer diameter is made larger for certain extent. Therefore, processing of such rod is easy, and for a joint-type fishing rod, assembling becomes easy.

According to the disclosure, it is possible to provide a fishing rod having a flexible and durable tip.

DESCRIPTION OF THE PREFERRED EMBODIMENTS

Figure 1:
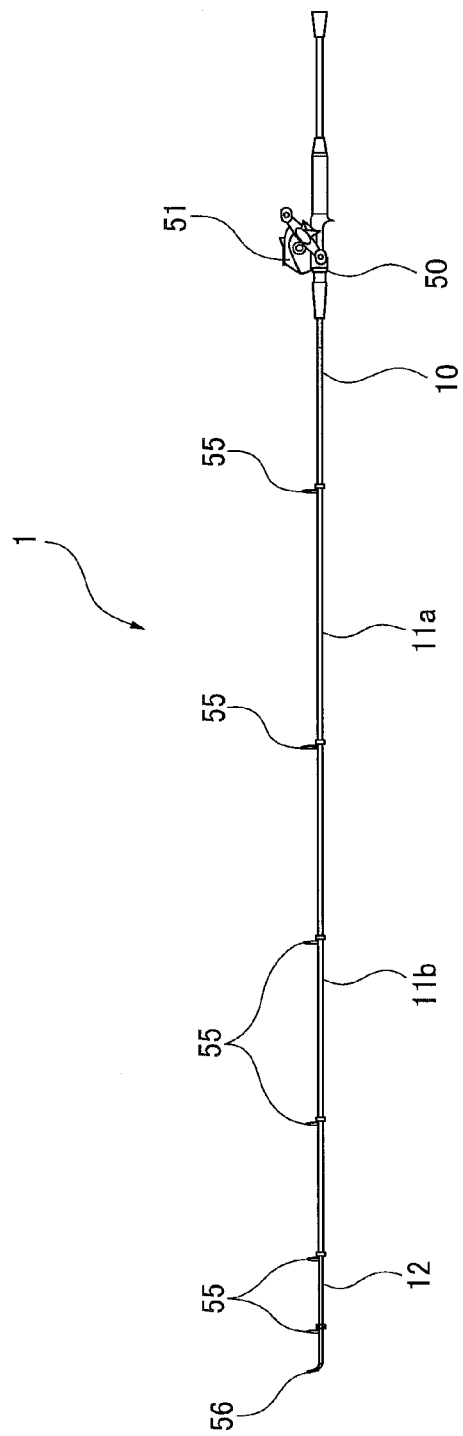
FIG. 1 is an overall view of a fishing rod according to an embodiment of the disclosure.

Embodiments of a fishing reel according to the disclosure will be now described with reference to the drawings. FIG. 1 is an overall view of an exemplary fishing rod according to the disclosure. A fishing rod according to the embodiment is a joint-type fishing rod with external guides. The fishing rod may include a butt side rod 10, more than one (two) intermediate rods 11a, 11b, and a tip rod 12, and they are jointed to form a telescopic fishing rod.

The butt side rod 10 and the intermediate rods 11a, 11b may be formed as tubular bodies made of a fiber-reinforced resin material in which a synthetic resin such as an epoxy resin and a polyester resin is reinforced with a reinforcement fiber such as a carbon fiber. The fishing rod 1 illustrated in FIG. 1 may have a reel seat 50 on the butt side rod 10, external guides 55 guiding a fishing line released from a reel 51 attached on the reel seat 50, and a top guide 56 with predetermined intervals therebetween. Some of the guides may be movable. Such external guides may be omitted in some embodiments. Although the telescopic fishing rod is illustrated, the fishing rods may be ordinary or inversely jointed.

Figure 2:
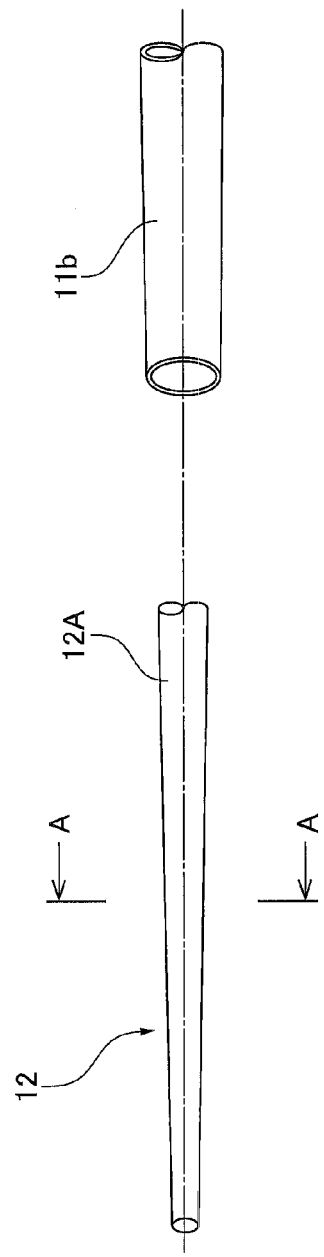
FIG. 2 is a sectional view of a tip rod of the fishing rod showing its structure in accordance with one embodiment.

FIG. 2 illustrates the tip rod 12 among the rods shown in FIG. 1. The tip rod 12 according to the embodiment has a solid body and a circular shape in cross-section. The tip rod 12 forms a tip portion of the fishing rod (hereunder the tip rod may also be referred to as the "tip") and is fitted into the intermediate rod 11b. The tip 12 is made of a composite material in which short fiber as a reinforcement material is dispersed in a matrix resin. Therefore, the tip 12 has a fine flexibility and durability with which the tip is less prone to breakage (cracking). Alternatively the tip rod 12 may be formed as a tubular body.

The tip rod 12 illustrated in FIG. 1 has the circular sectional shape and is made as a solid body over the length. Alternatively, the tip rod may be formed to include a proximal-end side portion of a tubular body and a distal-end side portion of a solid body. In other words, the tip rod may be formed by connecting the solid distal-end portion that serves as the tip and the tubular proximal-end side portion that serve as a tip-holding pole. When the fishing rod has this structure, it is possible to increase the sensitivity at a short area of the tip portion of the tip rod.

Figure 3:
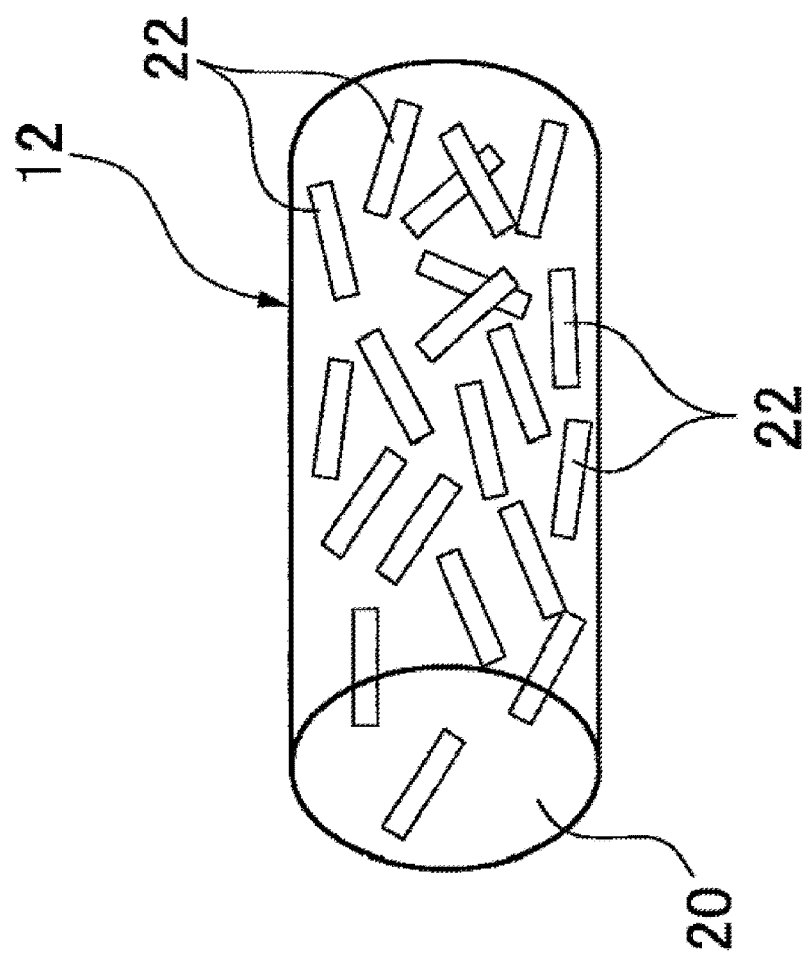
FIG. 3 schematically illustrates reinforced fiber (short fiber) contained in the tip rod.

The tip rod 12 may be a solid body made of a fiber-reinforced resin material in which a number of short fibers 22 serving as a reinforcing material is dispersed in a matrix resin 20 as illustrated in FIG. 3. Examples of the matrix resin 20 include thermoplastic resins (for example, polyamide, polypropylene, polyphenylene sulfide, polyether imide) and thermosetting resins (for example, epoxy, phenole). The matrix resin 20 may be formed of mainly a polyamide resin and additionally other thermoplastic resin (polyester, polycarbonate or the like).

The matrix resin 20 may contain other supplemental material (other than the reinforcing material). For example, the tip rod can be colored by mixing a colorant such as pigment in the matrix resin, moreover the weight of the tip rod can be reduced by foaming the matrix resin to mix microbubbles therein. Moreover, it is possible to optimize injection molding of the fiber-reinforced resin material by adding a fluidity modifier, an anti-static agent, a mold releasing agent, an antioxidant, and the like.

The reinforced fibers (the short fibers 22) dispersed in the matrix resin 20 may be, for example, carbon fibers such as PAN carbon fibers and pitch carbon fibers or glass fibers. The short fibers each have the average fiber diameter of 3 to 15 μm and the average fiber length of 0.5 to 10 mm.

The reason why the dimension of the short fibers 22 dispersed in the matrix resin is set in the above-describe range is that the tip rod requires a large amount of fibers to obtain a prescribed flexibility (a flexibility with a fine visual sensitivity) when the fiber diameter is smaller than 3 μm and the fiber length is shorter than 0.5 mm. If a large amount of fibers is mixed in the matrix resin, the fluidity at the time of molding is reduced and the short fibers cannot be uniformly distributed along the axial direction. Moreover, if the fiber diameter is larger than 15 μm and the fiber length is longer than 10 mm, the fluidity at the time of molding is also reduced although it is possible to set a content ratio of the fibers for obtaining a prescribed flexibility, and consequently the short fibers cannot be uniformly distributed along the axial direction.

The content of the above-described short fiber in the matrix resin is set to 3 to 50 wt %. This is because when the content of the short fibers having the above-described dimension is less than 3 wt %, a sufficient strength cannot be obtained, whereas when the content of the short fibers exceeds 50 wt %, the fluidity at the time of molding is reduced even with the above-described sized short fibers, and consequently the short fibers cannot be uniformly distributed along the axial direction. Moreover, considering the requirements (the softness, flexibility, and strength) for the tip rod, such requirements would be satisfied when the content of the short fibers is less than 50 wt %.

Note that all the short fibers contained in the matrix resin may not necessarily have the above-described size, some of them may be out of the above-mentioned range. In other words, as long as a large majority of the short fibers have average diameters and lengths within the above-described range, it is allowed that some short fibers have larger or smaller sizes out of the range.

The content of the short fibers may not necessarily be distributed uniformly along the axial direction. For example, when the content is increased gradually or in a stepwise fashion toward the proximal end along the axial direction, the distal end side of the tip rod can be easily bent and the rod can be made as a fast-action type. When the content is uniformly distributed along the axial direction and the fiber diameters are the same along the axial direction, flexing characteristics of the bent become uniform, but by providing a taper 12A on the surface of the tip rod as the diameter of the rod decreases toward the distal end as illustrated in FIG. 2, an amount of the bend can be increased toward the distal end. Moreover, when the taper 12A is formed as illustrated in FIG. 2 on the surface of the tip rod where the content of the short fibers is decreased toward the distal end, the distal end region of the tip rod can be easily bent, resulting in increased sensitivity. An example of a method for changing the content of the short fibers along the axial direction includes injecting fiber-reinforced resin materials with different fiber contents by using, for example, a two-color molding machine.

Figure 6:
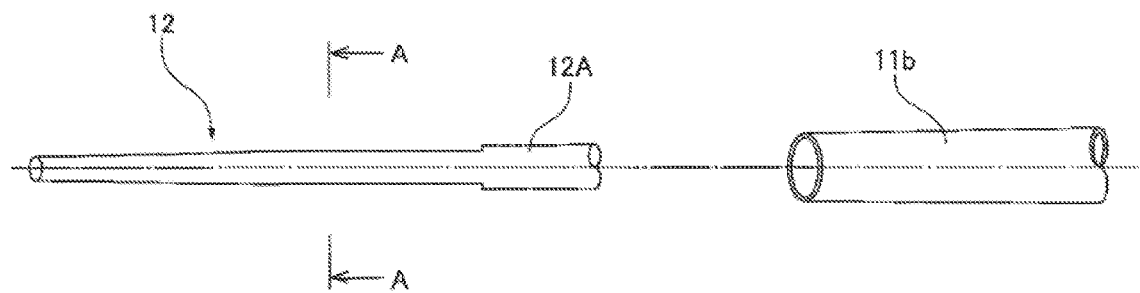
FIG. 6 is a sectional view of a tip rod of the fishing rod showing its structure in accordance with another embodiment.

As for the taper, as shown in FIG. 2, the whole of the tip rod may be tapered or only a distal end portion of the tip rod can be tapered. More specifically, the tip rod may be formed in a solid cylindrical shape by, for example, injection molding which will be described hereunder, and after the tip rod is molded the tip rod is then tapered such that the diameter of the tip rod is gradually decreased toward the distal end. In this way, it is possible to obtain a tip rod with fast action and increased flexibility. To obtain a tip rod with fast action, alternatively a step portion, as shown in FIG. 6, can be formed at the middle section of the tip rod so as to decrease the diameter of the rod toward the distal end (more than one such a step portion may be provided along the axial direction). In this case, two portions sandwiching the step portion may be made straight, or a portion in front of the step region may be tapered. By processing the surface of the tip rod in this way, the ratio of the short fibers that are aligned in the axial direction can be easily increased in the proximal end side. The step portion may be formed from a vertical surface orthogonal to the axial direction or a sloped surface with decreasing diameter toward the distal end.

As for the tip rod 12 made of the above-mentioned composite material, it is preferable that the short fibers 22 which serve as a reinforcing material be dispersed in the matrix resin 20 such that many of the short fibers 22 are distributed anisotropically in a radially inside region of the rod and aligned along the axial direction in a radially outside region of the rod. More specifically, as shown in the sectional view of FIG. 4, when the short fibers are aligned along the axial direction, the sections of such short fibers become substantially circular shapes (see the short fibers 22 in the radially outer region). When the short fibers are arranged anisotropically, such the sections of short fibers tend to be oblong or ellipse as the short fibers are cut diagonally in section (see the short fibers 22' in the radially center region). In other words, it is possible to effectively enhance the bending rigidity of the tip 12 when the short fibers are aligned along the axial direction in the outer radial region, and therefore the tip rod can be configured to be flexible with a prescribed elastic force. In addition, it is possible to increase the torsional strength of the tip rod when the short fibers are anisotropically arranged in the radially center region, and therefore it is possible to prevent breakage due to torsional stress.

Here, "many of the short fibers in the radially outer region are aligned along the axial direction" can be defined by seeing the tip rod in section (at any position) and figuring out a ratio of the short fibers with circular shape sections among a large number of short fibers dispersed in the synthetic resin. More specifically, supposing that a diameter of the tip rod 12 is D at a given position, if a ratio of the short fibers with circular sections in the radially outer region where is outside a circle with a radius of (1/2)D is larger than a ratio of the short fibers with circular sections inside the circle with the radius of (1/2)D, it can be defined that many of the short fibers aligned in the axial direction are distributed in a region closer to the surface of the tip rod. When the tip rod is configured in this way, it is possible to obtain a desired bending rigidity and increase the strength against torsion. The alignment of the short fibers illustrated in FIG. 4 can be realized through a hereunder-described manufacturing method.

Figure 4:
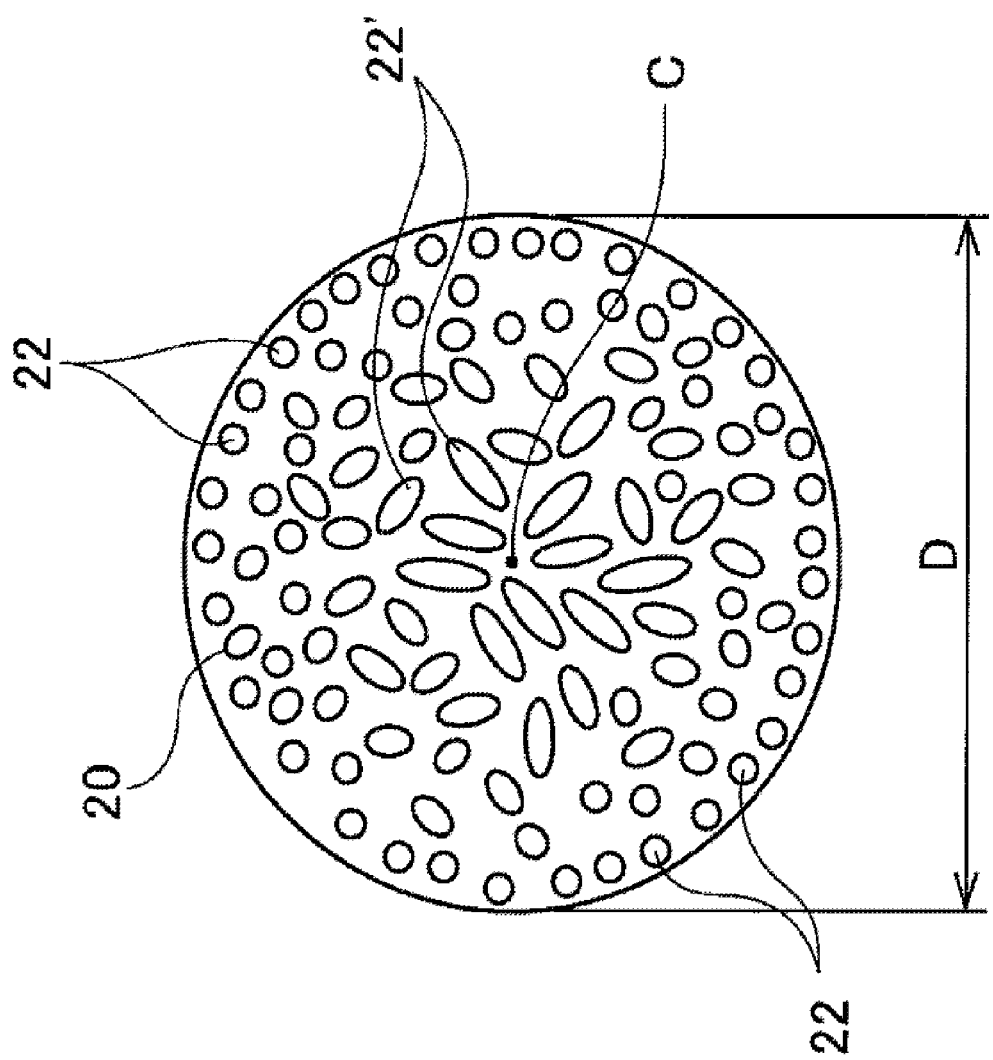
FIG. 4 is a cross sectional view of the tip rod along the line A-A (arbitrary position) of FIG. 2.
Figure 7:
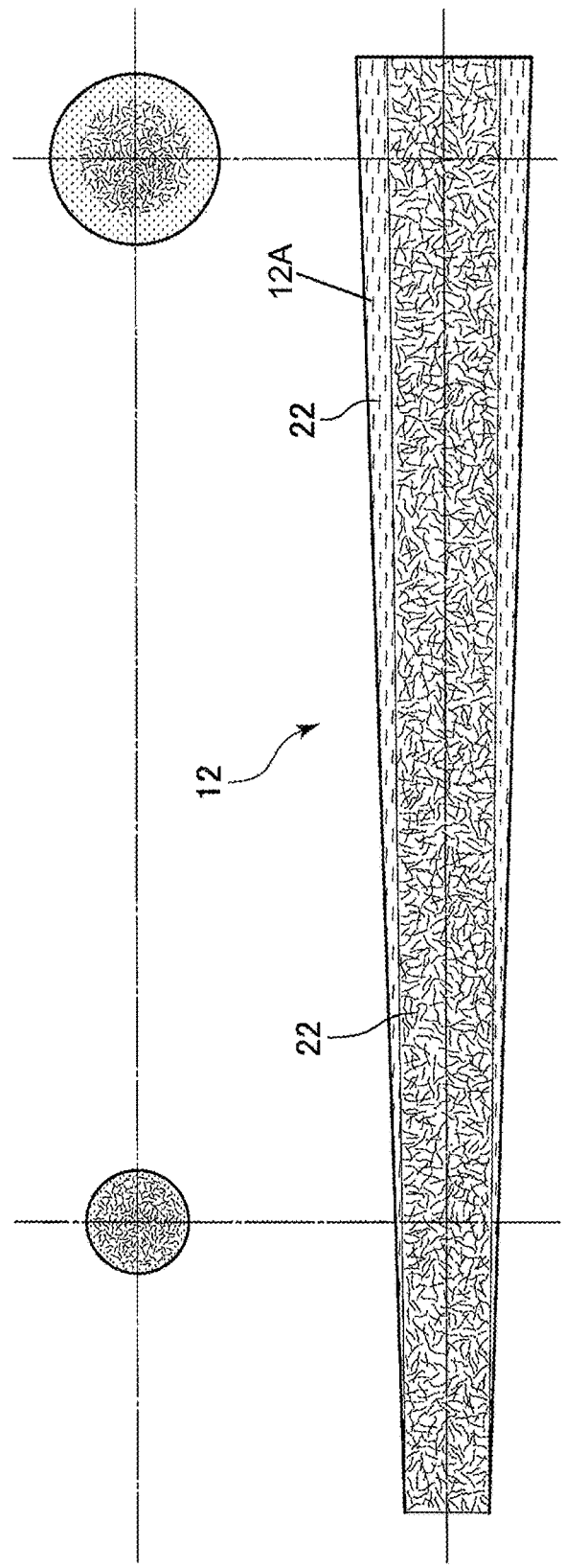
FIG. 7 shows sectional view of the tip rod showing fibers in the proximal-end and distal-end regions.

Moreover, when the distal-end portion of the solid tip rod is tapered or the step portion is formed in the middle section of the tip rod and the distal-end portion is tapered as described above and the short fibers distributed in the tip rod as shown in FIG. 4, the short fibers aligned along the axial direction are removed (by trimming the surface of the tip rod to be tapered or straight). Consequently, the short fibers are dispersed in the axial direction over the tip rod. With such configuration, the ratio of the short fibers aligned along the axial direction is larger in the proximal-end portion than the distal-end portion, such as illustrated in FIG. 7, and thereby the distal-end portion can be made more flexible. Alternatively, the whole tip rod may be made in a straight shape and the short fibers aligned along the axial direction can be more contained in the proximal-end portion to obtain increased flexibility in the distal-end portion.

Figure 5:
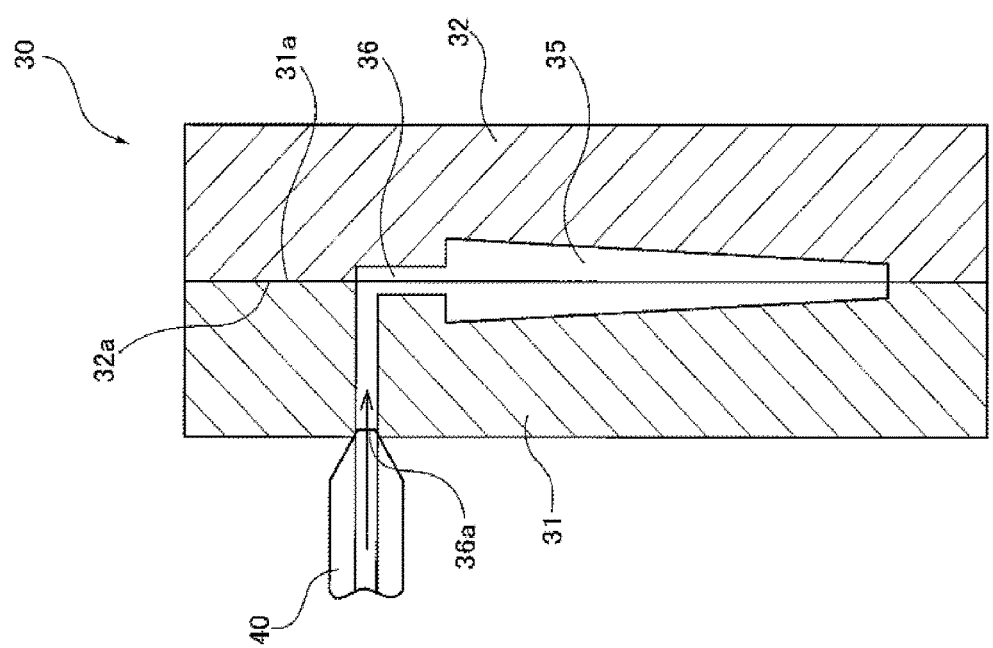
FIG. 5 illustrates an example of a mold used in a method of manufacturing the tip rod.

An example of a manufacturing method for the above-described tip rod 12 will be now described with reference to FIG. 5. The tip rod 12 with the taper 12A on its surface as shown in FIG. 2 can be formed by injection molding. For example, molding may be performed by injecting a fiber-reinforced resin material that contains the above-described short fibers into a mold 30 shown in FIG. 5. The mold 30 in this embodiment has two mold parts 31, 32 that can be separated from each other at the time of demolding. On contact surfaces 31a, 32a of the mold parts 31, 32, a cavity 35 of which contour corresponds to the contour of the tip rod 12 is formed. The mold parts 31, 32 each has a gate 36 through which a fiber-reinforced resin is injected into a predetermined position. The gate 36 communicates with the cavity 35 and has an opening 36a extending to a side of the mold 30. A nozzle 40 of a molding machine is inserted into the opening 36a and the fiber-reinforced resin material is injected therein. The mold 30 is placed such the tip rod that is gradually tapered toward the distal end vertically stands and the distal end of the tip rod faces the bottom. The fiber-reinforced resin material is injected into the cavity where the distal end of the tip rod faces the bottom.

The fiber-reinforced resin material to be injected is a thermoplastic resin that contains short fibers at a content of 3 to 50 wt %. The average fiber diameter of the short fibers is 3 to 15 µm, and the average fiber length of the short fibers is 0.5 to 10 mm. The thermoplastic resin is injected at a predetermined temperature (a thermoplastic temperature of about 200° C.). A temperature of the mold 30 is set lower than the temperature of the fiber-reinforced resin material to be injected therein. Therefore, the injected fiber-reinforced rein material is cooled and cured from a surface contacted with the inner surface of the mold 30. More specifically, the injected fiber-reinforced resin material flows along the axial direction of the tip rod 12 and therefore the short fibers included in the resin material are aligned along the axial direction with the flow. The resin material is then cured from the surface as it flows and therefore the short fibers in a region close to the surface tend to be aligned along the axial direction. However, there is some time before the resin in a region around the center of the material is cured, and even after the flow stops (the cavity has been substantially filled up with the fiber-reinforced resin material), the short fibers in that region are allowed to move freely to some extent and consequently each of the short fibers is directed differently.

As described above, the short fibers in the radially outer region can be aligned along the axial direction and the short fibers in the center region can be arranged anisotropically by adjusting the temperature difference between the fiber-reinforced resin material to be injected and the mold, and setting the injection direction (injecting vertically as described above). The arrangement of the short fibers as illustrated in FIG. 4 can be modified by changing an injection pressure of the fiber-reinforced resin material, the temperature difference between the mold and the resin material, the position of the gate, the number of the gates and the like.

The tip rod 12 according to the embodiment may also be formed by extrusion molding other than the above-described manufacturing method. When the tip rod is formed by extrusion molding, the shape of the tip rod becomes a circular cylinder so that centerless grinding can be performed onto the tip rod to obtain a desired shape.

Such tip rod 12 does not include the reinforced fibers extend to the proximal end to the distal end of the tip rod 12, and therefore there is no limitation by the elongation of such reinforced fibers. Consequently, the tip rod can be configured to be more soft (allowed a larger displacement) compared to conventional tip rods by selecting an appropriate matrix resin material. With the soft tip rod 12, it is possible to improve the sensitivity to sense a fish strike and enhance a visual sensitivity (a very small displacement of the tip) and an engagement characteristic (hook will not be easily released from fish). Moreover, such a tip rod is formed with the same hardness and strength, the outer diameter of the tip rod can be increased because the elasticity is low. As a result, it is possible to improve the assembling efficiency.

Embodiments of the present disclosure are not limited to the above descriptions and are susceptible to various modifications. For example, although the fishing rod according to the embodiment includes more than one rod (pole) is jointed to each other to form the entire fishing rod, the fishing rod can be formed as a single body that has the above-described features. Although the sectional shape of the tip rod is circular in the above-described embodiment, the sectional shape may be a non-circular shape such as oblong.

What is claimed is:

1. A fishing rod including a tip rod made of a fiber-reinforced resin material, wherein the tip rod is formed of short fibers dispersed in a matrix resin material, an average fiber diameter of the short fibers is 3 to 15 µm, an average fiber length of the short fibers is 0.5 to 10 mm, and a content of the short fibers is 3 to 50 wt %, and wherein the short fibers are dispersed in the matrix resin material such that a ratio of the short fibers that are arranged anisotropically in a radially inner region is larger compared to a ratio of the short fibers that are arranged anisotropically in a radially outer region.

2. The fishing rod of claim 1, wherein the tip rod is tapered toward a distal end of the tip rod.

3. The fishing rod of claim 1 wherein the matrix resign material contains a supplemental material other than the short fibers.

4. The fishing rod of claim 1, wherein the tip rod is configured to be jointed with a tip-holding pole.

5. A fishing rod having a solid tip rod made of a fiber-reinforced resin material, wherein the tip rod is formed of short fibers dispersed in a matrix resin material, an average fiber diameter of the short fibers is 3 to 15 µm, an average fiber length of the short fibers is 0.5 to 10 mm, and a content of the short fibers is 3 to 50 wt %, and a ratio of the short fibers aligned along an axial direction of the tip rod is larger in a proximal-end region of the tip rod compared to a ratio of the short fibers aligned along the axial direction of the tip rod in a distal-end region of the tip rod.

6. The fishing rod of claim 5, wherein a distal-end area of the distal-end region of the tip rod is tapered toward a distal end of the tip rod.

7. The fishing rod of claim 5, wherein a step portion is provided in a middle region of the distal-end region of the tip rod to decrease a diameter of the tip rod toward a distal end of the tip rod.

8. The fishing rod of claim 5, wherein the short fibers are dispersed in the matrix resin material such that a ratio of the short fibers that are arranged anisotropically in a radially inner region is larger compared to a ratio of the short fibers that are arranged anisotropically in a radially outer region, the short fibers aligned along the axial direction of the tip rod in a region closer to a distal end of the tip rod with respect to a tapered portion or step portion of the tip rod are at least partially removed.

* * * * *